United States Patent
Suzuki (10) Patent No.: US 12,479,242 B2
(45) Date of Patent: Nov. 25, 2025

(54) PNEUMATIC TIRE

(71) Applicant: Sumitomo Rubber Industries, Ltd., Kobe (JP)

(72) Inventor: Naoya Suzuki, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 89 days.

(21) Appl. No.: 18/536,987

(22) Filed: Dec. 12, 2023

(65) Prior Publication Data

US 2024/0208270 A1    Jun. 27, 2024

(30) Foreign Application Priority Data

Dec. 27, 2022  (JP) ................. 2022-209933

(51) Int. Cl.
| | | |
|---|---|---|
| *B60C 11/01* | (2006.01) | |
| *B60C 11/03* | (2006.01) | |
| *B60C 13/00* | (2006.01) | |
| *B60C 13/02* | (2006.01) | |

(52) U.S. Cl.
CPC .......... *B60C 11/01* (2013.01); *B60C 11/0306* (2013.01); *B60C 13/001* (2013.01); *B60C 13/02* (2013.01); *B60C 2011/036* (2013.01)

(58) Field of Classification Search
CPC ............ B60C 11/01; B60C 11/0306; B60C 2011/013; B60C 13/00; B60C 13/001; B60C 13/02
See application file for complete search history.

(56) References Cited

U.S. PATENT DOCUMENTS

| | | | |
|---|---|---|---|
| 2005/0000616 A1 | | 1/2005 | Frantz et al. |
| 2020/0406688 A1 | * | 12/2020 | Iwamoto ................. B60C 13/02 |
| 2021/0197627 A1 | * | 7/2021 | Nakano ............... B60C 15/0036 |
| 2022/0001702 A1 | | 1/2022 | Gonzalez |
| 2022/0097465 A1 | | 3/2022 | Sato |

FOREIGN PATENT DOCUMENTS

| | | | |
|---|---|---|---|
| JP | 2000-280711 A | | 10/2000 |
| JP | 2004203227 A | * | 7/2004 |
| JP | 2016-203420 A | | 12/2016 |
| JP | 2019-142369 A | | 8/2019 |

OTHER PUBLICATIONS

European Search Report for European Application No. 23219078.5, dated May 7, 2024.

* cited by examiner

*Primary Examiner* — Cedrick S Williams
(74) *Attorney, Agent, or Firm* — Birch, Stewart, Kolasch & Birch, LLP (57) ABSTRACT

A tire has a first sidewall portion having a reference surface and provided with a raised part. The raised part has a top surface having a second color. The tread portion is provided with shoulder lateral grooves and shoulder blocks The shoulder block has a first block wall surface inclined to the axially outer side toward the radially inner side from a first tread edge The radially inner edge of the first block wall surface is separated from the bottom surface of the shoulder lateral groove by at least 3 mm, and located axially inside a tire radial direction line passing through a position corresponding to the midpoint of the protruding height of the raised part.

13 Claims, 7 Drawing Sheets

PNEUMATIC TIRE

TECHNICAL FIELD

The present disclosure relates to a pneumatic tire.

BACKGROUND ART

Patent Document 1 below discloses a pneumatic tire in which a convex pattern indicating a brand, logo, etc. are formed on sidewall portions of the tire.
In order to improve the visibility of the convex pattern, a portion of a non-black rubber layer (e.g., white rubber layer) is exposed on the raised surface of the convex pattern.
Patent Document 1: Japanese Patent Application Publication No. 2016-203420

SUMMARY OF THE INVENTION

Problems to be Solved by the Invention

After driving a vehicle on icy and snowy roads or grounds, a large amount of snow and ice adheres to the surface of the tread together with mud. Therefore, when the vehicle is stopped in such a state, snow and ice adhering to the tread may turn into muddy water and flow down the tire sidewall portions.
In the case of a tire of which sidewall portions are provided with convex pattern made form non-black rubber such as white rubber, stains caused by muddy water are likely to be noticeable, and the appearance of the convex pattern may be impaired.
The present disclosure was made in view of the above-mentioned circumstances, and a primary objective of the present disclosure is to provide a pneumatic tire capable of suppressing deterioration of the appearance of the convex pattern provided on the sidewall portions.

Means for Solving the Problems

According to the present disclosure, a pneumatic tire comprises:
  a tread portion having a first tread edge and extending outwardly in the tire axial direction beyond the first tread edge; and
  a first sidewall portion extending inwardly in a tire radial direction from the tread portion,
wherein
  the first sidewall portion has a reference surface having a first color, and is provided with a raised part,
  in a first tire cross section including the tire rotational axis and the raised part, the raised part projects outwardly in a tire axial direction from the reference surface at a protruding height h so that the raised part has a top surface facing outward in the tire axial direction and having a second color different from the first color,
  the tread portion is provided with shoulder blocks separated by shoulder lateral grooves having bottom surfaces smoothly merged into the reference surface,
  on the outside in the tire radial direction of the raised part, at least one of the shoulder blocks is located,
  the at least one shoulder block has a first block wall surface which extends from the first tread edge toward the inside in the tire radial direction while inclining to the outside in the tire axial direction, and ends so as to have a radially inner edge,
  in the first tire cross section, a minimum distance from the radially inner edge to the bottom surface of the shoulder lateral groove is at least 3 mm, and the radially inner edge is located axially inside a straight line drawn parallel to the tire radial direction passing through the midpoint of the protruding height h of the raised part.

Effects of the Invention

Therefore, in the pneumatic tire according to the present disclosure, deterioration of the appearance of the raised part can be suppressed.

DETAILED DESCRIPTION OF THE INVENTION

Figure 1:
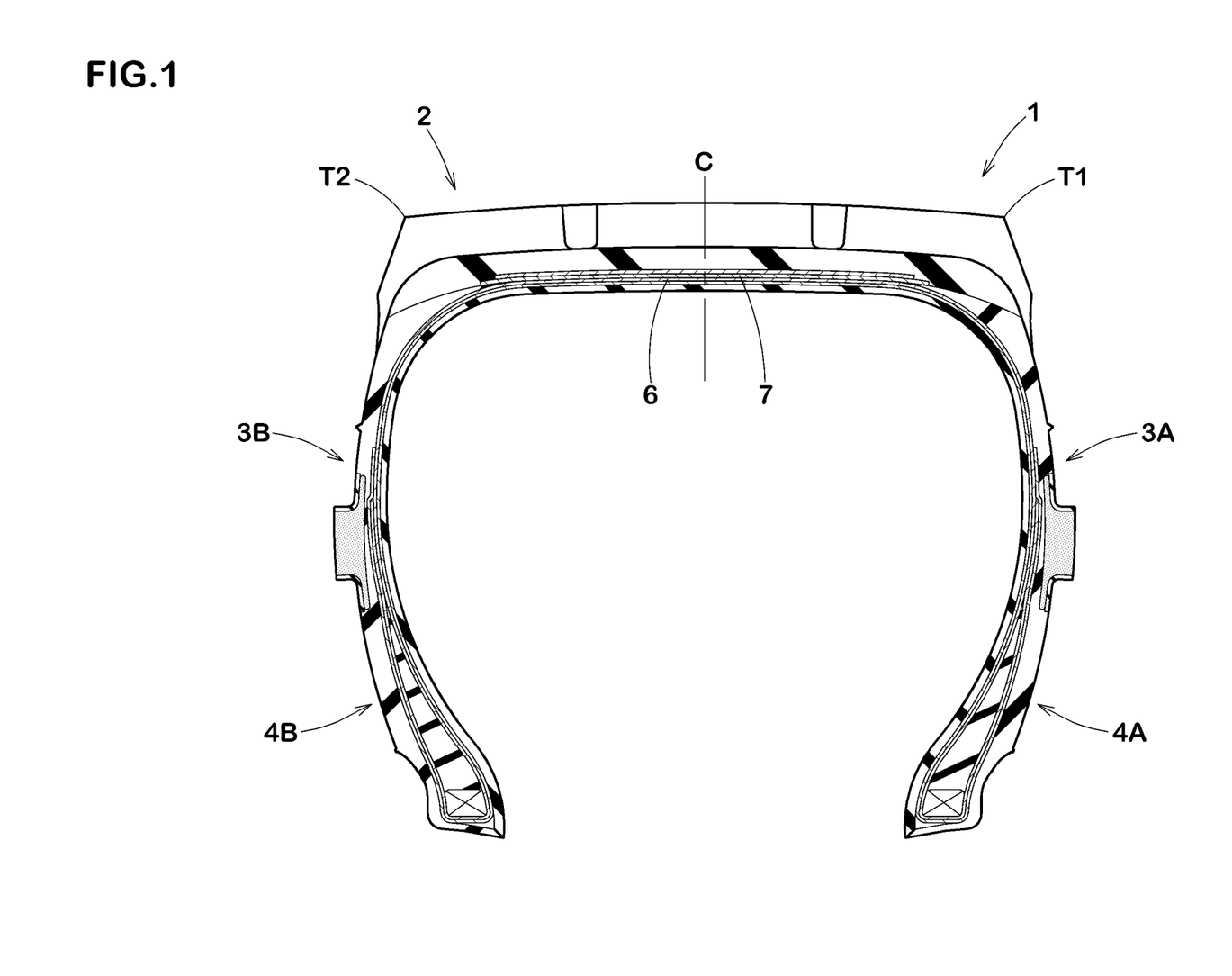
FIG. 1 is a cross-sectional view of a tire as an embodiment of the present disclosure.

An embodiment of present disclosure will now be described in detail in conjunction with accompanying drawings.
FIG. 1 is a cross-sectional view of a pneumatic tire 1 as an embodiment of the present disclosure, showing a first cross section including the rotational axis of the tire 1 in its standard state.
In this embodiment, the tire 1 is a pneumatic tire for passenger cars, suitably used as a winter tire intended for driving on icy and snowy roads or ground.
The present disclosure is however, not limited to such a tire, and may be applied to a pneumatic tire for heavy duty vehicles, for example.
In the case that the tire 1 is a kind of pneumatic tires for which various standards have been established:
  the "standard state" means a state of the tire when mounted on a standard wheel rim, and inflated to a standard tire pressure, but loaded with no tire load:
  the "standard wheel rim" is a wheel rim specified for the tire in a standard system including standards on which the tire is based, for example, the "Standard rim" in JATMA, "Design Rim" in TRA, "Measuring Rim" in ETRTO:
  the "standard tire pressure" is the air pressure specified for the tire in the above-mentioned standard system, for example, the "maximum air pressure" in JATMA, "INFLATION PRESSURE" in ETRTO, and the maximum air pressure listed in the table "TIRE LOAD LIMITS AT VARIOUS COLD INFLATION PRESSURES" in TRA; and
  the undermentioned "standard load" is the load specified for the tire in the above-mentioned standard system, for example, the "maximum load capacity" in JATMA, "LOAD CAPACITY" in ETRTO, and the maximum tire load listed in the table "TIRE LOAD LIMITS AT VARIOUS COLD INFLATION PRESSURES" in TRA.

In the case that the tire 1 is a tire for which various standards are not yet established:
the "standard state" means a standard usage state depending on the purpose of use of the tire and in a condition in which the tire is not attached to a vehicle and no tire load is applied; and
the undermentioned "standard load" means the maximum load that can be applied when the tire is used depending on the purpose of use.

In this application including specification and claims, dimensions and positions of each part or portion of the tire refer to those measured under the standard state unless otherwise noted, The tire 1 comprises a tread portion 2, a first sidewall portion 3A, a second sidewall portion 3B, a first bead portion 4A, and a second bead portion 4B.

The first sidewall portion 3A and the second sidewall portion 3B extend inward in the tire radial direction from the tread portion 2. The first sidewall portion 3A and the second sidewall portion 3B have a substantially same structure.

The first bead portion 4A is continuous to the inner side in the tire radial direction of the first sidewall portion 3A. The second bead portion 4B is continuous to the inner side in the tire radial direction of the second sidewall portion 3B. The first bead portion 4A and the second bead portion 4B have a substantially same structure.

The structure and configuration of the first sidewall portion 3A described below can be applied to the second sidewall portion 3B.

Further, the tire 1 comprises a carcass 6 and a tread reinforcing layer 7.

The carcass 6 extends from the first bead portion 4A to the second bead portion 4B through the first sidewall portion 3A, the tread portion 2, and the second sidewall portion 3B.

The tread reinforcing layer 7 is disposed radially outside the carcass 6 in the tread portion 2.

In the present disclosure, a pair of tread edges, namely, a first tread edge T1 and a second tread edge T2, of the tread portion 2 are defined as the axially outermost edges of the ground contacting patch of the tire when the tire under its standard state is placed on a horizontal flat surface at a camber angle of 0 degrees and loaded by 70% of the normal load.

Figure 2:
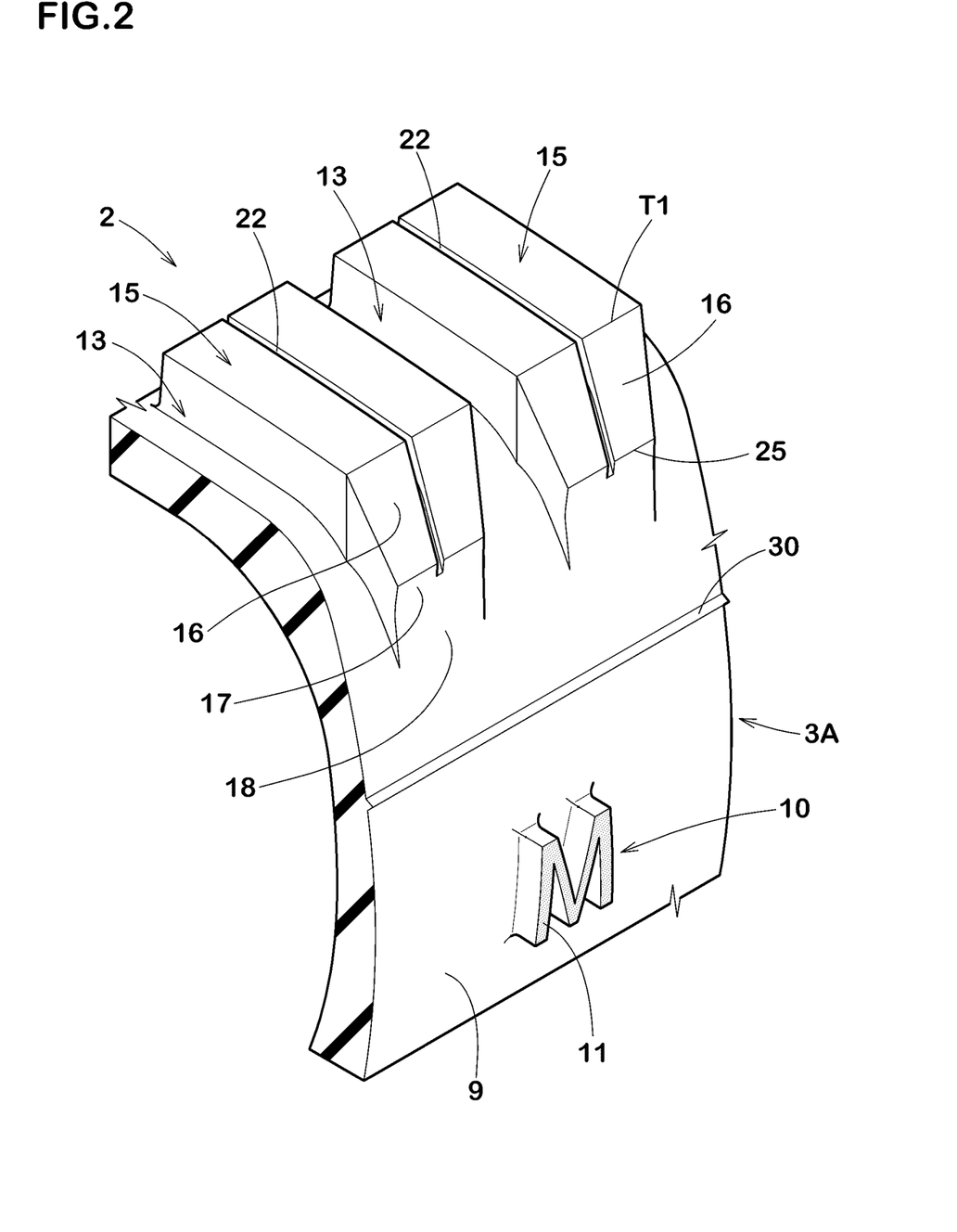
FIG. 2 is a perspective view showing a tread portion and a first sidewall portion of FIG. 1.

In FIG. 2 showing a part of the tread portion 2 and a part of the first sidewall portion 3A, internal structural components are not shown.

As shown in Fig. and Fig., the first sidewall portion 3A has a reference surface 9 having a first color, and is provided with a raised part 10 which protrudes from the reference surface 9. The first color of the reference surface 9 in this example is black.

Figure 3:
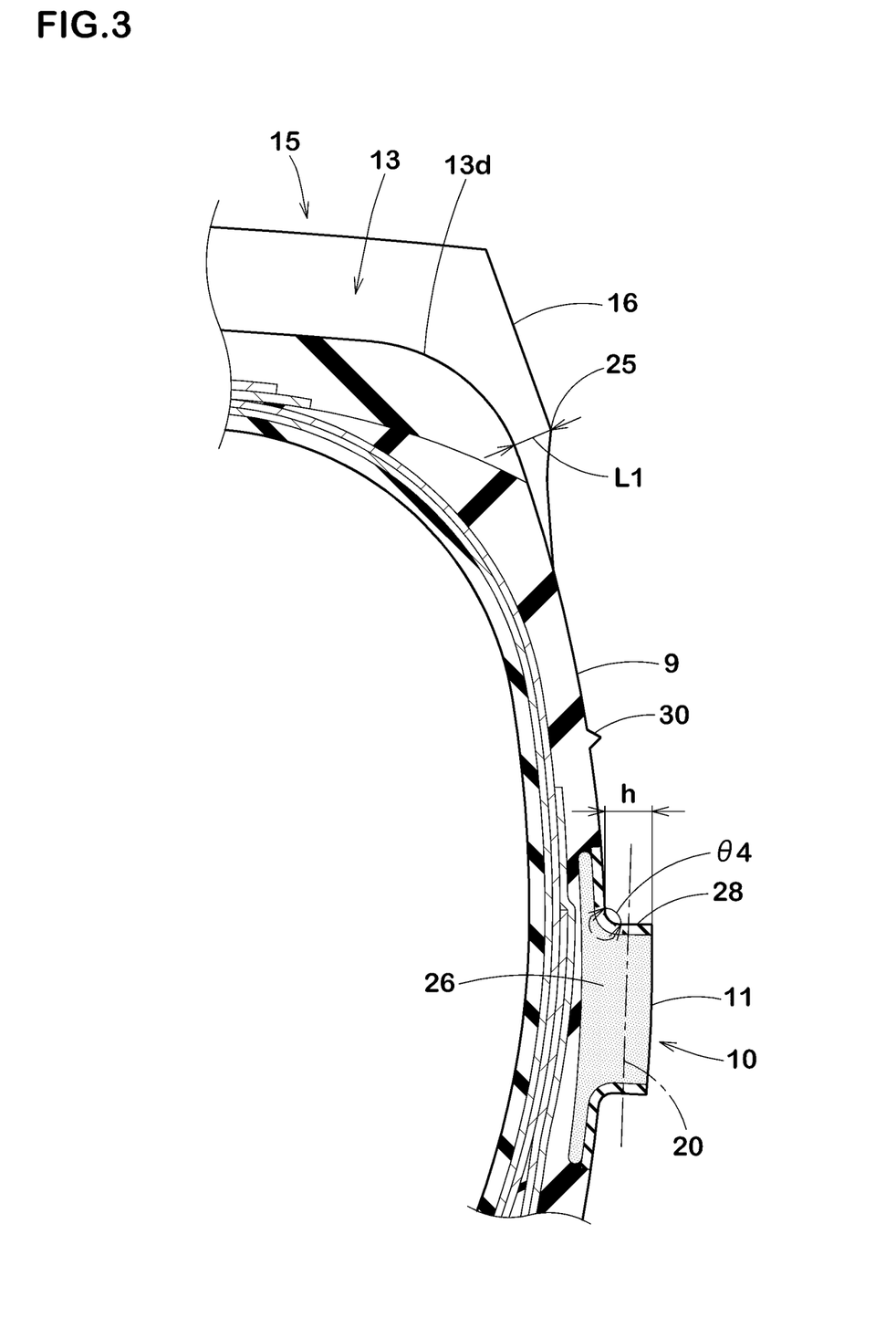
FIG. 3 is a cross-sectional view showing the tread portion and the first sidewall portion of FIG. 1.

As shown in FIG. 3, in a tire meridian cross section, or a tire cross section including the tire rotational axis and the raised part 10, the raised part 10 protrudes outwardly in the tire axial direction from the reference surface 9 at a protruding height h.

Here, the protruding height h is defined as the maximum height in the tire axial direction from the reference surface 9 at the root of the raised part 10 immediately outside in the tire radial direction to the axially outermost point of the raised part 10.

As shown in FIG. 2, the raised part 10 constitutes a character, characters, a figure, figures, a symbol or symbols. In FIG. 2, as an example, the raised part 10 forms an English character "M".

The raised part 10 has a top surface 11 facing outward in the tire axial direction, and the top surface 11 has a second color different from the first color. In FIG. 2, the top surface 11 is dotted. In FIG. 3, a different-colored rubber member 26 forming the top surface 11 and having the second color is dotted.

The second color in this example is white. Namely, the different-colored rubber member 26 is made from white rubber.

However, the present disclosure is not limited to such white rubber, and various colors may be adopted for the top surface 11.

As shown in FIG. 2, the tread portion 2 is provided with shoulder blocks 15 divided by shoulder lateral grooves 13. Each of the shoulder lateral grooves 13 extends outwardly in the tire axial direction beyond the tread edge T1, and has a bottom surface smoothly merged into the reference surface 9 of the first sidewall portion 3A.

As shown in FIG. 2 and FIG. 3, on the radially outer side of the raised part 10, there is located at least one of the shoulder blocks 15 which has a first block wall surface 16. The first block wall surface 16 extends inwardly in the tire radial direction from the first tread edge T1 on the shoulder block 15 while inclining outwardly in the tire axial direction.

The first block wall surface 16 has an inner edge 25 in the tire radial direction, which is spaced apart from the bottom surface of the shoulder lateral groove 13, and a minimum distance LI from the inner edge 25 to the bottom surface is not less than 3 mm in a tire meridian section as shown in FIG. 3.

As a result, when driving on a snowy road or ground, the shoulder blocks 15 sink into the snow together with the first block wall surfaces 16, and shear the snow, thereby increasing snow traction.

Further, such a configuration can be expected to suppress damage of the bottom surface 13d of the shoulder lateral groove 13 near the inner edge 25.

The first block wall surface 16 in this example is inclined at a constant angle with respect to the tire radial direction.

In the case of the first block wall surface 16 having a variable angle with respect to the tire radial direction,
the inner edge 25 corresponds to a position where the first block wall surface 16 is no longer inclined in the above-mentioned direction, namely, inclined to the axially outside toward the radially inside.

The inner edge 25 of the first block wall surface 16 is located axially inside a straight line 20 passing through a position corresponding to the midpoint of the protruding height h of the raised part.

Therefore, when the tire 1 with such configuration is stopped after driving on an icy and snowy road or ground, even if muddy water formed by melted snow and ice on the tread flows down to the inner edge 25, the dripping hits the reference surface 9 of the first sidewall portion 3A or the side surface of the raised part 10 and flows down, therefore, the muddy water becomes difficult to reach the top surface 11 of the raised part 10 and adhere thereto. As a result, the appearance of the raised part 10 can be maintained.

Hereinafter, configurations of the present embodiment will be detailed.

Note that each configuration described below indicates a specific example in the present embodiment, therefore, the present disclosure can exhibit the above-described effects even if it does not include the configuration described below. Further, even if any one of the configurations described below is applied alone to the tire of the present disclosure having the above-mentioned characteristics, an improvement in performance in accordance with the applied configuration can be expected.

Furthermore, when some of the configurations described below are applied in combination, a combined performance improvement in accordance with the applied configurations can be expected.

Figure 4:
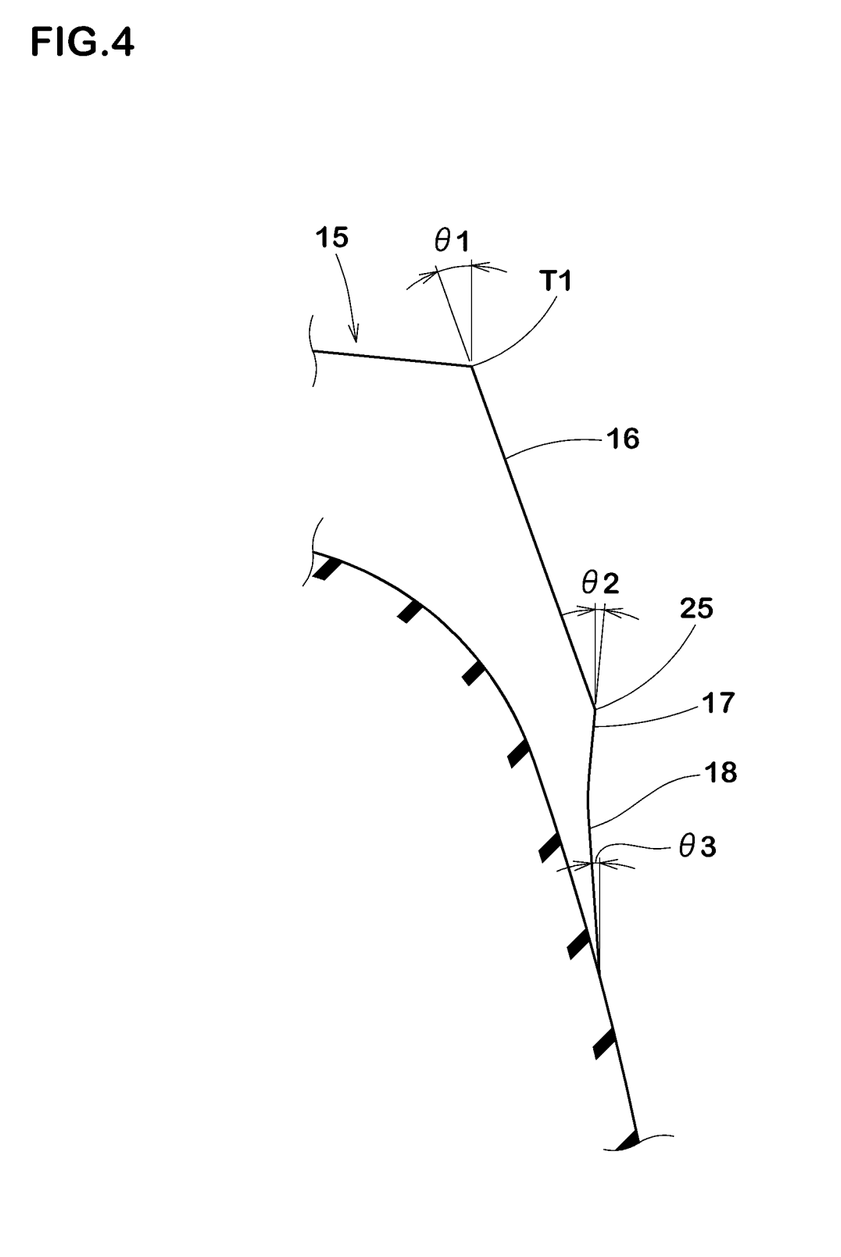
FIG. 4 is a cross-sectional view showing a shoulder block that can be seen in FIG. 3.

FIG. 4 is a cross-sectional view showing a shoulder block 15 that can be seen in FIG. 3.

As shown in FIG. 4, the first block wall surface 16 extends from the first tread edge T1, namely, the axially outer edge of the shoulder block 15 toward the inner side in the tire radial direction,
while inclined to the axially outside at a constant angle, to have a radially inner edge. Thus, the first block wall surface 16 is an inclined flat surface.

The angle θ1 of the first block wall surface 16 with respect to the tire radial direction is, for example, in a range from 20 to 30 degrees.

The present disclosure is however, not limited to this example, and the first block wall surface 16 may be smoothly curved.

As shown in FIG. 2, the dimension of the first block wall surface 16 in the tire circumferential direction is gradually decreased toward the inside in the tire radial direction. Thereby, the shoulder lateral grooves 13 can catch a large volume of snow, and excellent on-snow performance is exhibited.

The present disclosure is however, not limited to such configuration.

The first block wall surface 16 in this embodiment is provided with at least one narrow groove 22 extending from the first tread edge T1 at least to the inner edge 25 of the first block wall surface 16.

Preferably, the narrow groove 22 traverses the ground contacting top surface of the shoulder block 15 from the first tread edge T1 toward the inside in the tire axial direction. Such narrow grooves 22 improve the on-snow performance, and help to prevent muddy water from adhering to the top surface 11 of the raised part 10 by dispersing the path for muddy water to flow down.

As shown in FIG. 4, the shoulder block 15 has a second block wall surface 17 and a third block wall surface 18.

The second block wall surface 17 is connected to the radially inner edge 25 of the first block wall surface 16. The second block wall surface 17 is parallel to the tire radial direction, or alternatively, inclined to the inside in the tire axial direction toward the inside in the tire radial direction from the radially inner edge 25 of the first block wall surface 16.

The third block wall surface 18 is connected to the radially inner edge of the second block wall surface 17. The third block wall surface 18 is inclined to the outside in the tire axial direction toward the inside in the tire radial direction from the radially inner edge of the second block wall surface 17.

The angle θ2 of the second block wall surface 17 with respect to the tire radial direction is not more than 50 degrees, preferably not more than 20 degrees. This prevents muddy water from dripping from the radially inner edge 25 of the first block wall surface 16, making it easier for muddy water to flow down along the second block wall surface 17, and making it difficult for muddy water to adhere to the top surface 11 of the raised part 10.

In order to prevent muddy water from adhering to the top surface 11 of the raised part 10, it is preferred that, between the radially inner edge 25 of the first block wall surface 16 and the raised part 10, the muddy water is guided to flow down along the outer surface of the tire so that the muddy water flows at a relatively slow speed. From this point of view, the angle θ3 of the third block wall surface 18 with respect to the tire radial direction is set in a range from 10 to 20 degrees, for example.

From a similar point of view, it is preferred that the axially outer surface of the tire between the radially inner edge 25 of the first block wall surface 16 and the raised part 10, has a portion or portions where the angle with respect to the tire radial direction is 10 degrees or less, and the total length in the tire radial direction of such portion or portions is not more than 6.5 times the protruding height h.

The raised part 10 has a radially outer side surface 28 facing outward in the tire radial direction and extending from the reference surface 9 of the first sidewall portion 3A to the top surface 11.

The angle θ4 between the radially outer side surface 28 and the reference surface 9 is set in a range from 80 to 98 degrees. Thereby, the muddy water flowing down along the reference surface 9 of the first sidewall portion 3A is reduced in flowing force, and flows sideways. As a result, the muddy water becomes difficult to reach the top surface 11 of the raised part 10 and adhere thereto.

As shown in FIG. 2, it is desirable that, between the shoulder block 15 and the raised part 10, there is formed a rib 30 extending in the tire circumferential direction and protruding outward in the tire axial direction.

Such ribs 30 can direct the flow of muddy water along the tire circumferential direction, and can further suppress muddy water from adhering to the top surface 11 of the raised part 10.

Figure 5:
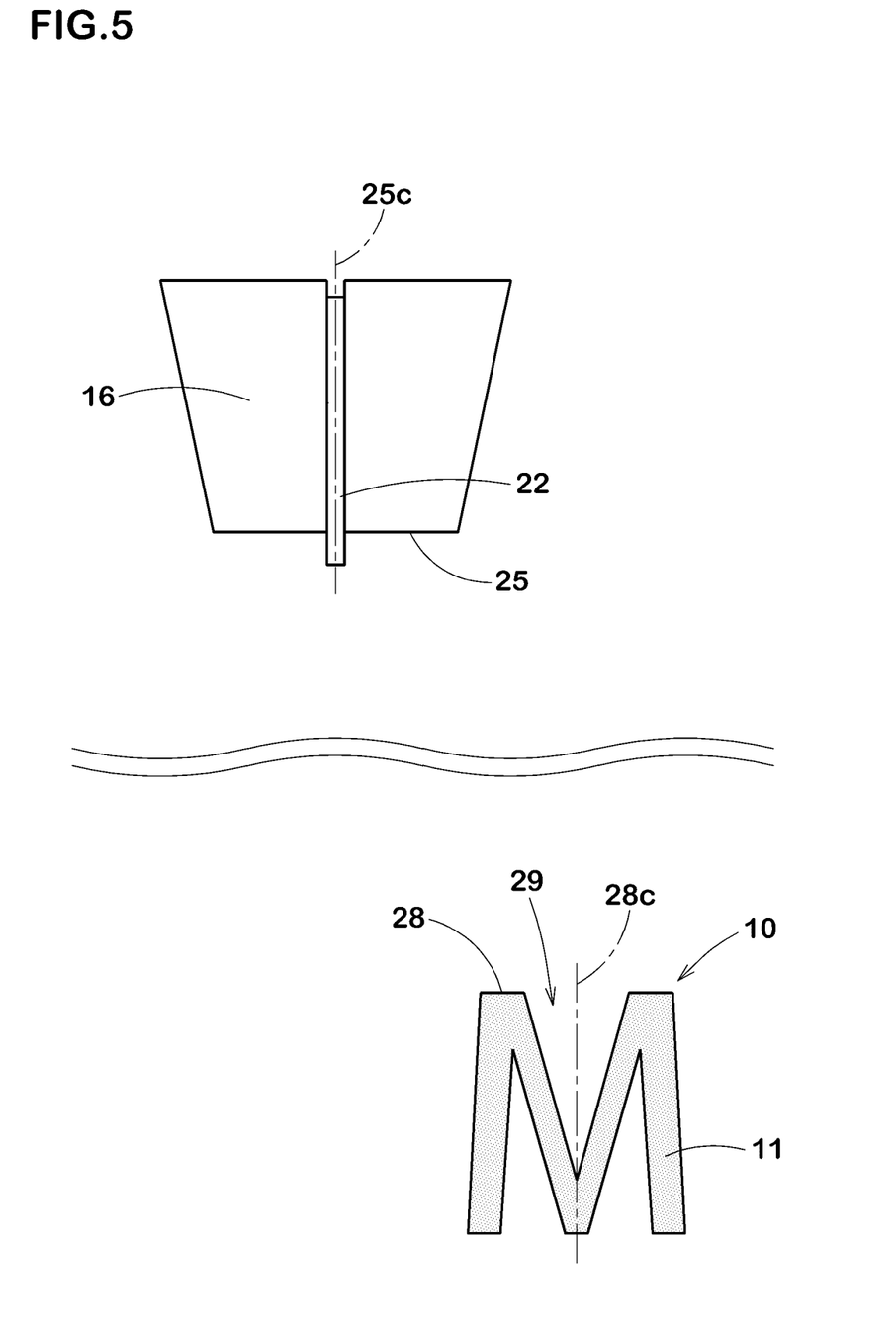
FIG. 5 is a side view of the tire conceptually showing the positional relationship between a raised part and a first block wall surface.

FIG. 5 is an enlarged schematic side partial view of the tire showing the positional relationship between the first block wall surface 16 and the raised part 10.

As shown in FIG. 5, it is desirable that the position in the tire circumferential direction of the center 28c in the tire circumferential direction of the radially outer side surface 28 of the raised part 10 is shifted in the tire circumferential direction from the center position 25c in the tire circumferential direction of the radially inner edge 25 of the first block wall surface 16. This makes it difficult for muddy water flowing down from the first block wall surface 16 to adhere to the top surface 11 of the raised part 10.

When the radially inner edge 25 is interrupted by the narrow groove 22 as in the present embodiment, the center position 25c is determined by filling up the narrow groove 22.

In this embodiment, since "M" is formed by the raised part 10, the radially outer side surface 28 in this example includes a recess 29 which is concave inwardly in the tire radial direction when viewed from the side of the tire as shown in FIG. 5.

Further, the center position in the tire circumferential direction of the recess 29 (in this embodiment, corresponds to the center position 28c of the radially outer side surface 28) is shifted in the tire circumferential direction from the center position 25c in the tire circumferential direction of the radially inner edge 25 of the first block wall surface 16.

Thereby, it is possible to suppress muddy water from entering the recess 29.

Figure 6:
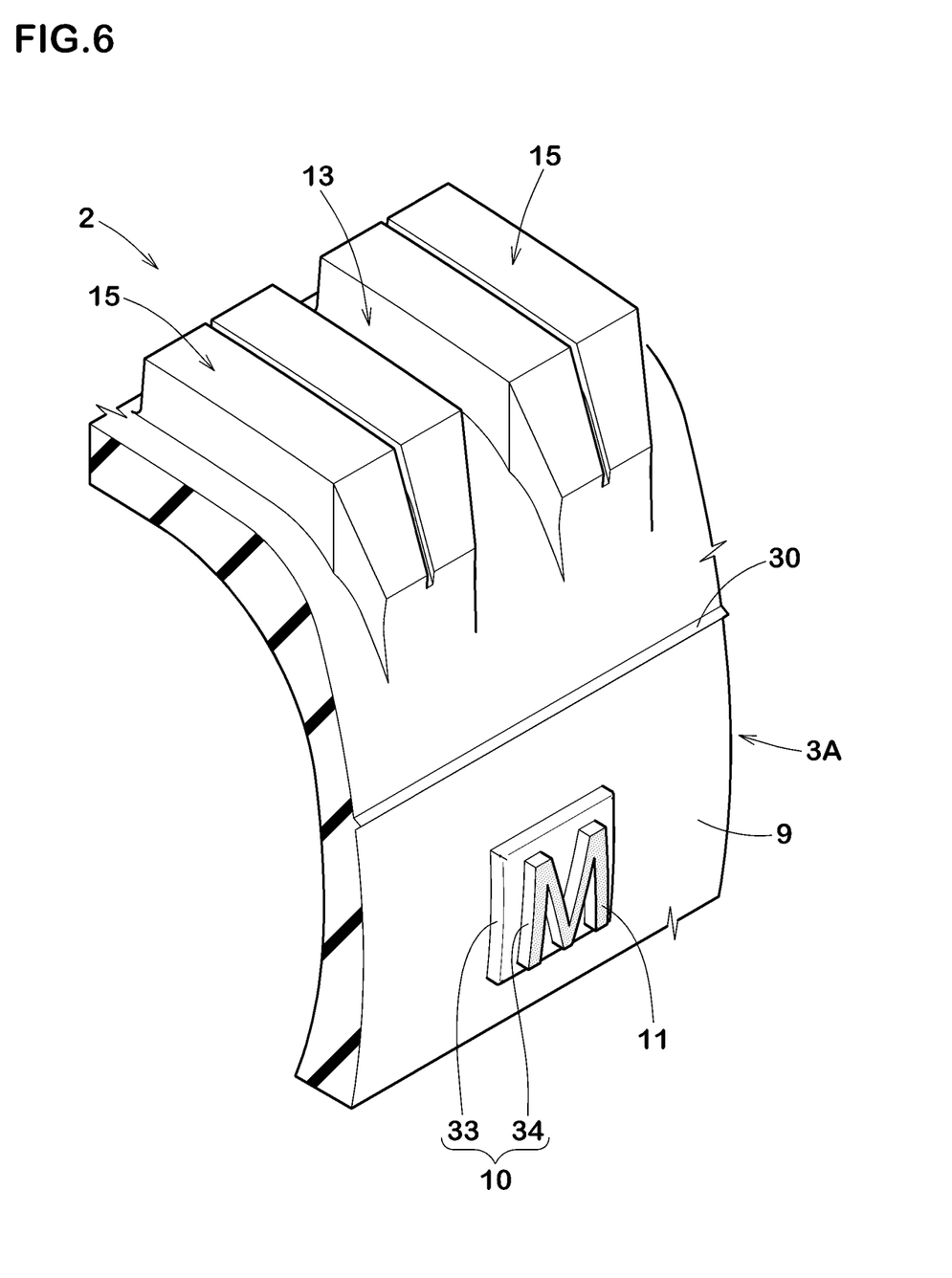
FIG. 6 is a perspective view showing the tread portion and first sidewall portion of another embodiment of the present disclosure.
Figure 7:
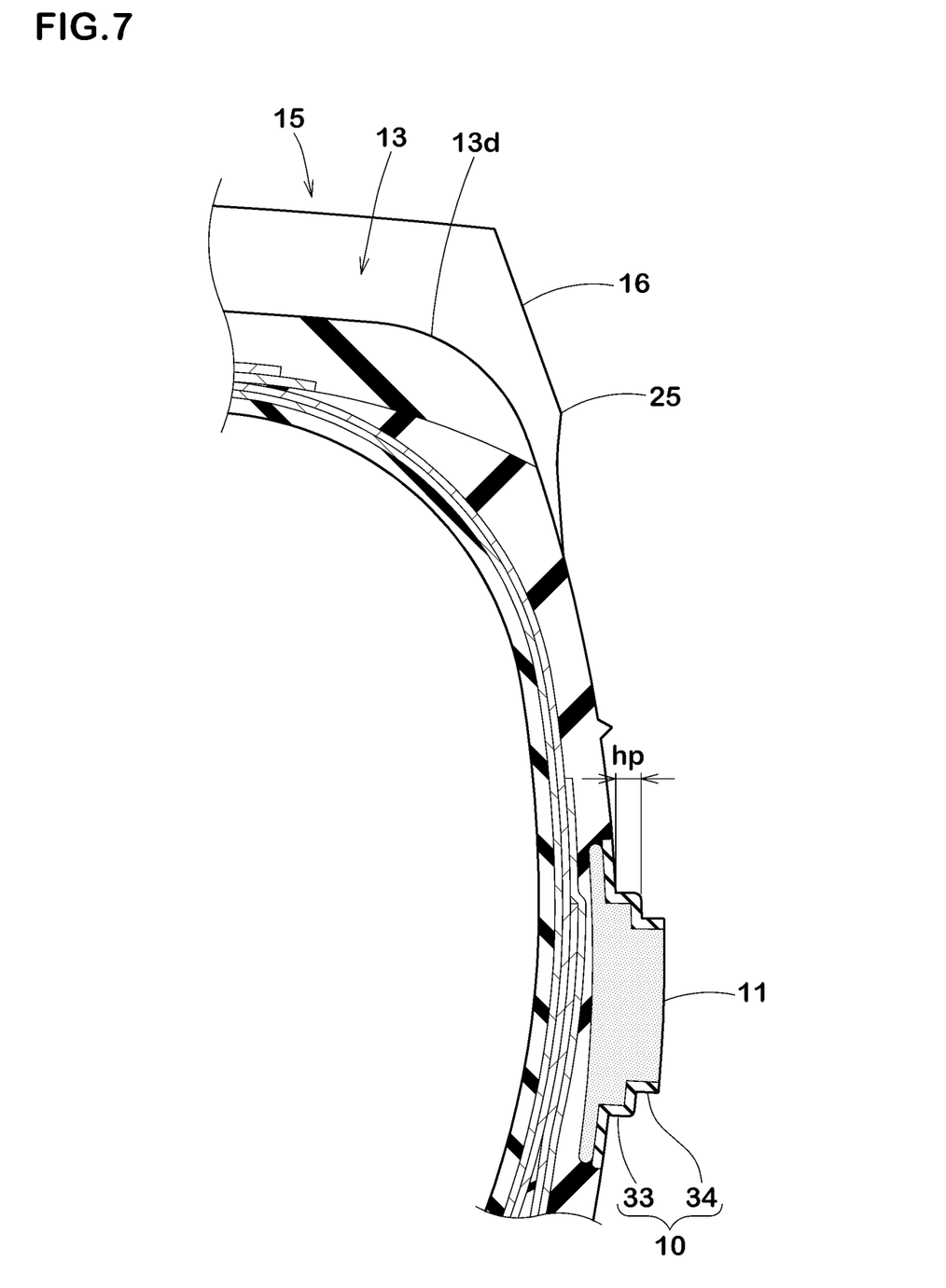
FIG. 7 is a cross-sectional view showing the tread portion and first sidewall portion of FIG. 6.

FIG. 6 shows another example of the raised part 10.
FIG. 7 shows a cross section of the raised part 10 shown in FIG. 6.
As shown in FIG. 6 and FIG. 7, in this example, the raised part 10 comprises
- a pedestal portion 33 protruding outward in the tire axial direction from the reference surface 9, and
- a mark portion 34 protruding outward in the tire axial direction from the pedestal portion 33 and constituting a letter or letters, a figure or figures or a symbol or symbols.

In this example, since the raised part 10 includes the pedestal portion 33, it is possible to effectively suppress muddy water from adhering to the top surface 11 of the raised part 10.

As shown in FIG. 7, the axially outer surface of the tire between the radially inner edge 25 of the first block wall surface 16 and the raised part 10, has a portion or portions where the angle with respect to the tire radial direction is 10 degrees or less, and the total length in the tire radial direction of such portion or portions is not more than 4.0 times the maximum protruding height HP in the tire axial direction of the pedestal portion 33. Thereby, the speed at which the muddy water flows down can be reduced, and the adhesion of the muddy water to the top surface 11 of the raised part 10 can be effectively suppressed.

While detailed description has been made of preferable embodiments of the present disclosure, the present disclosure can be embodied in various forms without being limited to the illustrated embodiments.

Working Example

Based on the structure shown in FIG. 1, a pneumatic tire of size 185/85R16 was experimentally manufactured as a working example, tire, wherein the radially inner edge of the first block wall surface was separated from the bottom surface of the shoulder lateral groove by at least 3 mm, and located on the inner side in the tire axial direction than the straight line extending parallel to the tire radial direction passing through the position corresponding to the midpoint of the protruding height of the raised part.

Further, a comparative example tire was manufactured. The comparative example tire was the same as the working example tire, excepting that the radially inner edge of the first block wall surface was located on the outer side in the tire axial direction than the straight line extending parallel to the tire radial direction passing through the position corresponding to the midpoint of the protruding height of the raised part.

These test tires were tested for the performance that maintains the appearance of the raised part (hereinafter, the appearance maintaining performance) as follows.

<Appearance Maintaining Performance>

A test car to which the test tires were attached, was driven on a ground covered with compacted snow of about 5 cm thickness for about 10 minutes, then kept in a pit at a room temperature of 5 degrees C. or above. After the snow and ice on the tires had completely melted, the appearance of the raised part was visually observed and evaluated into ten ranks wherein the higher the rank number, the better the appearance.

Test car: 660 cc 4WD car
Wheel rim size: 16×5.5 J
Tire inflation pressure: 220 kPa The test results are shown in Table 1 below.

TABLE 1

| Tire | Comparative example | Working Example |
|---|---|---|
| Appearance maintaining performance | 6 | 9 |

From the test results, it was confirmed that, in comparison with the comparative example tire, the working example tire according to the present disclosure was able to suppress deterioration of the appearance of the raised part.

Statement of the Present Disclosure

The present disclosure is as follows:
[Present Disclosure 1]
A pneumatic tire comprising: a tread portion having a first tread edge; and a first sidewall portion extending inward in the tire radial direction from the tread portion,
wherein
the first sidewall portion comprises: a reference surface having a first color; and a raised part protruding outward in the tire axial direction from the reference surface at a protruding height h in a first cross section of the tire including the rotational axis of the tire and the raised part,
the raised part has a top surface facing outward in the tire axial direction and having a second color different from the first color,
the tread portion is provided with: a plurality of shoulder lateral grooves having a bottom surface extending outwardly in the tire axial direction beyond the first tread edge and smoothly merged into the reference surface of the first sidewall portion: and a plurality of shoulder blocks divided by the shoulder lateral grooves,
at least one of the shoulder blocks is located on the outer side in the tire radial direction, of the raised part,
the at least one shoulder block has a first block wall surface extending from the first tread edge toward the inner side in the tire radial direction, while inclining to the outer side in the tire axial direction, so as to have a radially inner edge, and
in the above-said first cross section, the radially inner edge of the first block wall surface is located inward in the tire axial direction of a straight line drawn parallel to the radial direction of the tire passing through a position corresponding to a midpoint (h/2) of the protruding height h of the raised part.
[Present Disclosure 2]
The pneumatic tire according to Present Disclosure 1, wherein
the at least one shoulder block has a second block wall surface connected to the radially inner edge of the first block wall surface, and
the second block wall surface extends inward in the tire radial direction from the radially inner edge of the first block wall surface, while inclining to the inner side in the tire axial direction or in parallel to the tire radial direction, so that the angle of the second block wall surface with respect to the tire radial direction is not more than 50 degrees.

[Present Disclosure 3]
The pneumatic tire according to Present Disclosure 1 or 2, wherein
the outer surface of the tire between the radially inner edge of the first block wall surface and the raised part has a portion or portions where the angle with respect to the radial direction of the tire is 10 degrees or less in the above-said first cross section, and a total length in the tire radial direction of the portion or portions is not more than 6.5 times the protruding height h in the above-said first cross section.

[Present Disclosure 4]
The pneumatic tire according to Present Disclosure 1, 2 or 3, wherein
the raised part has a radially outer side surface facing outward in the tire radial direction, and extending from the reference surface to the top surface of the first sidewall portion, and
the angle between the radially outer side surface and the reference surface is in a range from 80 to 98 degrees in the above-said first cross section.

[Present Disclosure 5]
The pneumatic tire according to Present Disclosure 1, 2, 3 or 4, wherein
a rib protruding outward in the tire axial direction and extending in the circumferential direction of the tire, is provided between the at least one shoulder block and the raised part.

[Present Disclosure 6]
The pneumatic tire according to Present Disclosure 1, 2, 3, 4 or 5, wherein
the first block wall surface is provided with at least one narrow groove extending from the first tread edge to the radially inner edge of the first block wall surface.

[Present Disclosure 7]
The pneumatic tire according to Present Disclosure 4, wherein
the dimension in the tire circumferential direction of the first block wall surface is gradually decreased toward the inner side in the tire radial direction, and
the center position in the tire circumferential direction of the radially outer side surface is shifted in the tire circumferential direction from the center position in the tire circumferential direction of the radially inner edge of the first block wall surface.

[Present Disclosure 8]
[Present Disclosure 8.1]
The pneumatic tire according to any one of Present Disclosures 1 to 3 and 5 to 7, wherein
the raised part has a radially outer side surface facing outward in the tire radial direction, and extending from the reference surface to the top surface of the first sidewall portion,
the radially outer side surface includes a recess concave inward in the tire radial direction, and
the center position in the tire circumferential direction of the recess is shifted in the tire circumferential direction from the center position in the tire circumferential direction of the radially inner edge of the first block wall surface.

[Present Disclosure 8.2]
The pneumatic tire according to any one of Present Disclosure 4, wherein
the radially outer side surface includes a recess concave inward in the tire radial direction, and
the center position in the tire circumferential direction of the recess is shifted in the tire circumferential direction from the center position in the tire circumferential direction of the radially inner edge of the first block wall surface.

[Present Disclosure 9]
The pneumatic tire according to any one of Present Disclosures 1 to 8, wherein
the raised part comprises a pedestal portion protruding outward in the tire axial direction from the reference surface, and a mark portion protruding outward in the tire axial direction from the pedestal portion and constituting a letter, a figure or a symbol,
the outer surface of the tire between the radially inner edge of the first block wall surface and the raised part has a portion or portions where the angle with respect to the radial direction of the tire is 10 degrees or less in the above-said first cross section, and
a total length in the tire radial direction of the portion or portions is not more than 4.0 times a maximum protruding height in the tire axial direction of the pedestal part in the above-said first cross section.

DESCRIPTION OF THE REFERENCE SIGNS 2 tread portion
3A first sidewall portion
9 reference surface
10 raised part
11 top surface
13 shoulder lateral groove
13d bottom surface
15 shoulder block
16 first block wall surface
25 radially inner edge of first block wall surface 16
T1 first tread edge

The invention claimed is:
1. A pneumatic tire comprising:
a tread portion having a first tread edge; and
a first sidewall portion extending inward in a tire radial direction from the tread portion,
wherein
the first sidewall portion comprises
a reference surface having a first color, and
a raised part protruding outward in a tire axial direction from the reference surface at a protruding height h in a first cross section of the tire including a rotational axis of the tire and the raised part,
the raised part has a top surface facing outward in the tire axial direction and having a second color different from the first color,
the tread portion is provided with
a plurality of shoulder lateral grooves each having a bottom surface extending outwardly in the tire axial direction beyond the first tread edge and smoothly merged into the reference surface of the first sidewall portion, and
a plurality of shoulder blocks divided by the shoulder lateral grooves,
at least one of the shoulder blocks is located on an outer side in the tire radial direction, of the raised part,
the at least one of the shoulder blocks has a first block wall surface extending from the first tread edge toward an inner side in the tire radial direction, while inclining to an outer side in the tire axial direction, so as to have a radially inner edge,
in the first cross section, the radially inner edge of the first block wall surface is separated from the bottom surface of the respective shoulder lateral groove, so that a minimum distance from the radially inner edge to the bottom surface is not less than 3 mm, in the first cross section, the radially inner edge of the first block wall surface is located inward in the tire axial direction of a straight line drawn parallel to the tire radial direction passing through a position corresponding to a midpoint (h/2) of the protruding height h of the raised part, an outer surface of the tire between the radially inner edge of the first block wall surface and the raised part has a portion or portions where an angle with respect to the tire radial direction is 10 degrees or less in the first cross section, and a total length in the tire radial direction of the portion or portions is not more than 6.5 times the protruding height h in the first cross section.

2. The pneumatic tire according to claim 1, wherein the first block wall surface is provided with at least one narrow groove extending from the first tread edge to the radially inner edge of the first block wall surface.

3. The pneumatic tire according to claim 1, wherein the raised part has a radially outer side surface facing outward in the tire radial direction, and extending from the reference surface to a top surface of the first sidewall portion, the radially outer side surface includes a recess concave inward in the tire radial direction, and a center position in the tire circumferential direction of the recess is shifted in the tire circumferential direction from a center position in the tire circumferential direction of the radially inner edge of the first block wall surface.

4. The pneumatic tire according to claim 1, wherein the raised part comprises a pedestal portion protruding outward in the tire axial direction from the reference surface, and a mark portion protruding outward in the tire axial direction from the pedestal portion and constituting a letter, a figure, or a symbol, and the total length in the tire radial direction of the portion or portions is not more than 4.0 times a maximum protruding height in the tire axial direction of the pedestal part in the first cross section.

5. The pneumatic tire according to claim 1, wherein the at least one of the shoulder blocks has a second block wall surface connected to the radially inner edge of the first block wall surface, and the second block wall surface extends inward in the tire radial direction from the radially inner edge of the first block wall surface, while inclining to an inner side in the tire axial direction or in parallel to the tire radial direction, so that an angle of the second block wall surface with respect to the tire radial direction is not more than 50 degrees.

6. The pneumatic tire according to claim 5, wherein the raised part has a radially outer side surface facing outward in the tire radial direction, and extending from the reference surface to a top surface of the first sidewall portion, and an angle between the radially outer side surface and the reference surface is in a range from 80 to 98 degrees in the above-said first cross section.

7. The pneumatic tire according to claim 1, wherein a rib protruding outward in the tire axial direction and extending in a tire circumferential direction, is provided between the at least one of the shoulder blocks and the raised part.

8. The pneumatic tire according to claim 7, wherein the first block wall surface is provided with at least one narrow groove extending from the first tread edge to the radially inner edge of the first block wall surface.

9. A pneumatic tire comprising:

a tread portion having a first tread edge; and a first sidewall portion extending inward in a tire radial direction from the tread portion, wherein the first sidewall portion comprises a reference surface having a first color, and a raised part protruding outward in a tire axial direction from the reference surface at a protruding height h in a first cross section of the tire including a rotational axis of the tire and the raised part, the raised part has a top surface facing outward in the tire axial direction and having a second color different from the first color, the tread portion is provided with a plurality of shoulder lateral grooves each having a bottom surface extending outwardly in the tire axial direction beyond the first tread edge and smoothly merged into the reference surface of the first sidewall portion, and a plurality of shoulder blocks divided by the shoulder lateral grooves, at least one of the shoulder blocks is located on an outer side in the tire radial direction, of the raised part, the at least one of the shoulder blocks has a first block wall surface extending from the first tread edge toward an inner side in the tire radial direction, while inclining to an outer side in the tire axial direction, so as to have a radially inner edge, in the first cross section, the radially inner edge of the first block wall surface is separated from the bottom surface of the respective shoulder lateral groove, so that a minimum distance from the radially inner edge to the bottom surface is not less than 3 mm, in the first cross section, the radially inner edge of the first block wall surface is located inward in the tire axial direction of a straight line drawn parallel to the tire radial direction passing through a position corresponding to a midpoint (h/2) of the protruding height h of the raised part, the raised part has a radially outer side surface facing outward in the tire radial direction, and extending from the reference surface to the top surface of the first sidewall portion, and an angle between the radially outer side surface and the reference surface is in a range from 80 to 98 degrees in the first cross section.

10. The pneumatic tire according to claim 9, wherein a rib protruding outward in the tire axial direction and extending in a tire circumferential direction, is provided between the at least one of the shoulder blocks and the raised part.

11. The pneumatic tire according to claim 9, wherein the first block wall surface is provided with at least one narrow groove extending from the first tread edge to the radially inner edge of the first block wall surface.

12. The pneumatic tire according to claim 9, wherein
a dimension in a tire circumferential direction of the first block wall surface is gradually decreased toward the inner side in the tire radial direction, and
a center position in the tire circumferential direction of the radially outer side surface is shifted in the tire circumferential direction from the center position in the tire circumferential direction of the radially inner edge of the first block wall surface.

13. The pneumatic tire according to claim 9, wherein
the radially outer side surface includes a recess concave inward in the tire radial direction, and
a center position in the tire circumferential direction of the recess is shifted in the tire circumferential direction from a center position in the tire circumferential direction of the radially inner edge of the first block wall surface.

* * * * *